Nov. 9, 1937.   H. GILMORE   2,098,451
METHOD OF STRENGTHENING CRANKCASES
Filed July 18, 1936   2 Sheets—Sheet 1
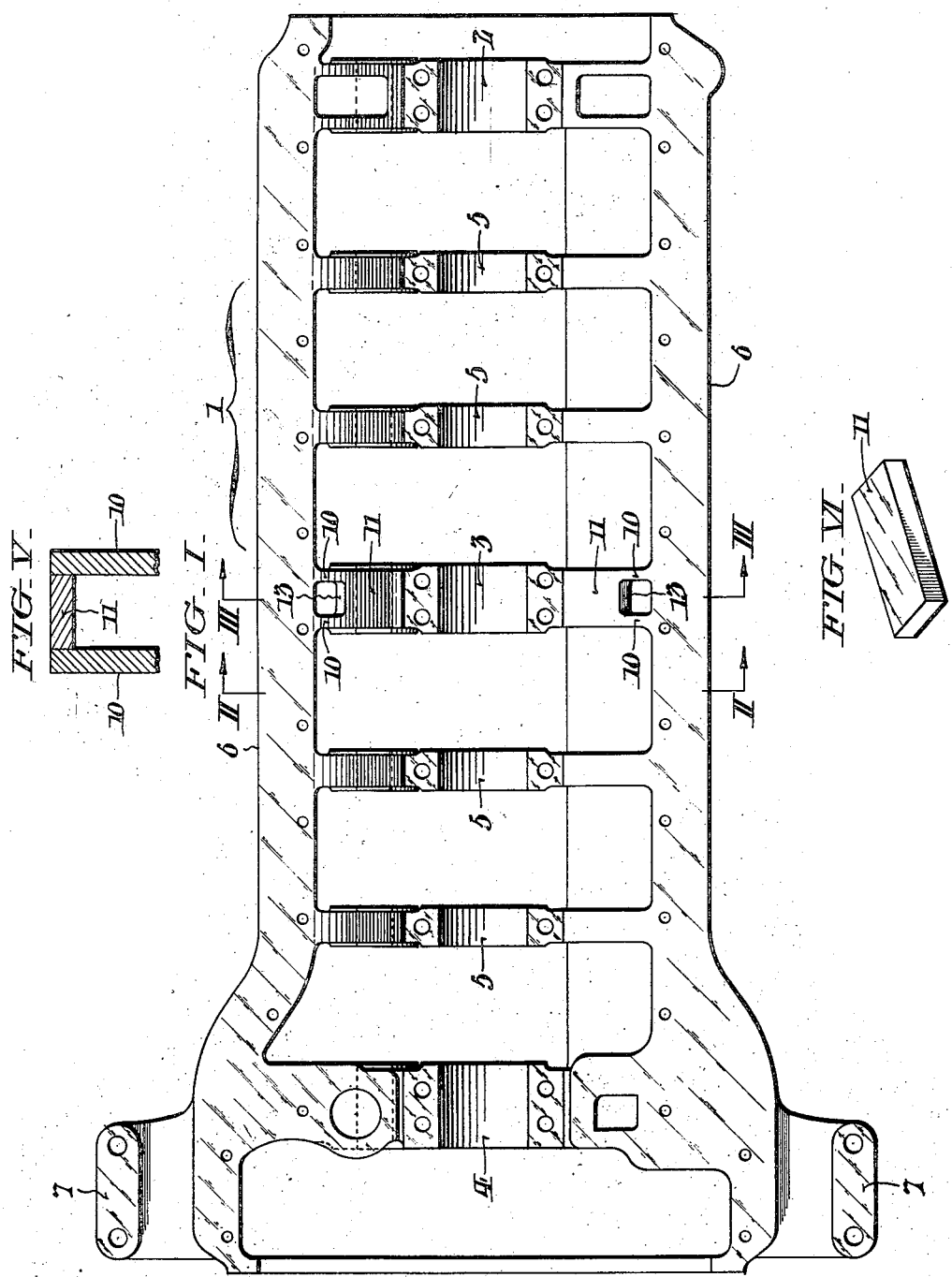

Nov. 9, 1937. H. GILMORE 2,098,451
METHOD OF STRENGTHENING CRANKCASES
Filed July 18, 1936 2 Sheets-Sheet 2
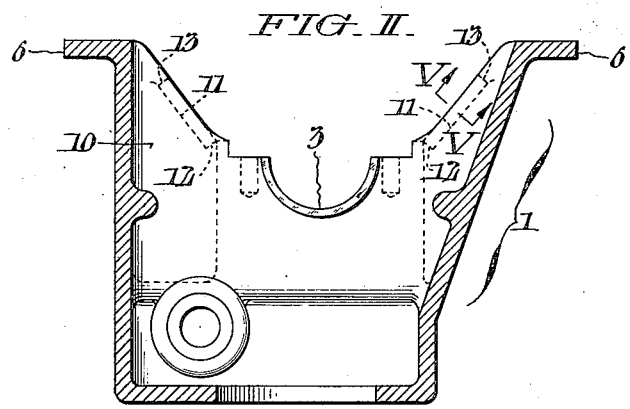
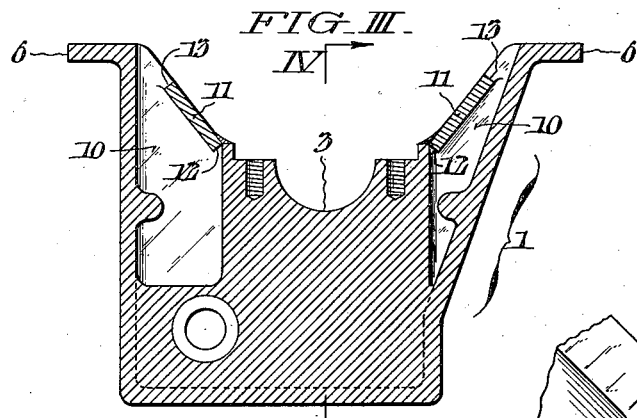
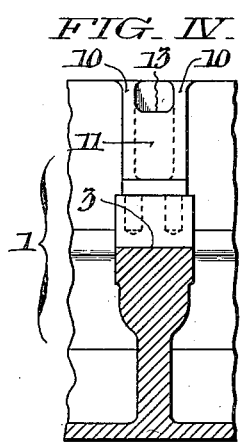
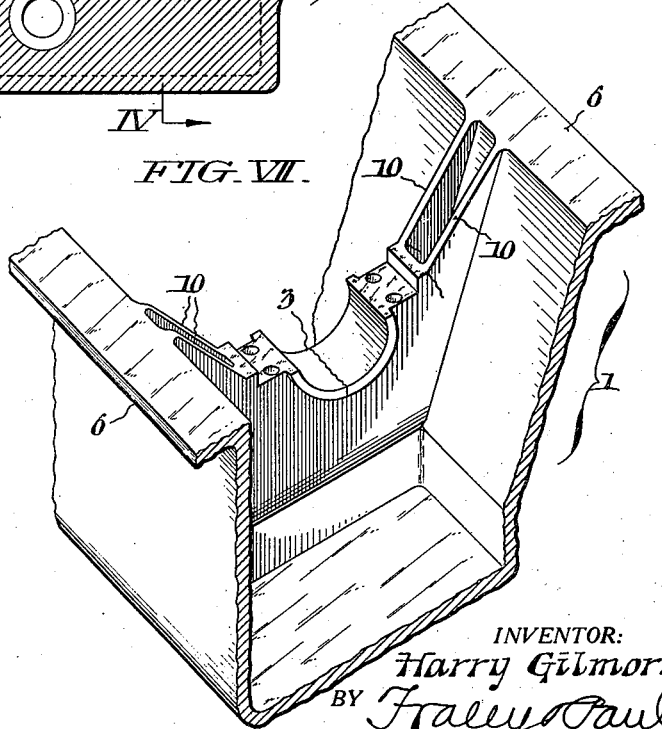
WITNESSES:
Thomas W. Kerr, Jr.
Stanton W. Kerr
INVENTOR:
Harry Gilmore,
BY Fraley Paul
ATTORNEYS.

Patented Nov. 9, 1937

2,098,451

UNITED STATES PATENT OFFICE 2,098,451

METHOD OF STRENGTHENING CRANKCASES

Harry Gilmore, Camden, N. J.

Application July 18, 1936, Serial No. 91,361

1 Claim. (Cl. 29—156.4)

My invention relates generally to crank cases and more specifically to means for strengthening crank cases without adding materially to their weight.

Much attention has been given to the lightening of crank cases, particularly those of busses and truck. Aluminum is now used in the manufacture of many crank cases and excess metal which does not give strength has been gradually eliminated from the design of crank cases. There has been so much attention given to the avoidance of excess metal that the art has not fully appreciated the possibilities of strategic additions which will strengthen weakness without material increase of weight.

These lightened crank cases have shown a tendency to develop weaknesses at certain points, one of which is around the center main bearing. This weakness persits in spite of the use of double webs to support this center bearing. This is probably due to the fact that the center bearing bears the brunt of the whipping that inevitably occurs in a crank shaft in use. Obviously the whipping will be greatest at the center bearing, positioned midway between the two end bearings. It is therefore a common occurrence to find that a crank or fissure has developed in the center bearing proper or its associated supporting webs. These cracks may also develop in other parts of the casing.

My invention has for its main object the strengthening of crank cases, particularly around the center bearing, without a material increase in weight. Another object is the general strengthening of the crank case as an integrated unit by tying the structure together at a strategic point. Another object is to accomplish the above objects in an old crank case by simple repair work as well as in new crank cases. Other objects and advantages of my invention will be apparent to the skilled artisan from the following description, reference being had to the accompanying drawings.

Fig. I shows a plan view of an upper crank case in which an embodiment of my invention is shown.

Fig. II is a transverse section taken about the lines II—II of Fig. I, showing the center bearing with a supporting web.

Fig. III is a transverse section taken about the lines III—III of Fig. I.

Fig. IV is a partial longitudinal section taken about the lines IV—IV of Fig. III.

Fig. V is a sectional view taken about the lines V—V of Fig. II showing the flange member of my invention in place between two webs of the center main bearing.

Fig. VI is a perspective view of the flange member alone.

Fig. VII is a perspective view of the portion of the crank case about the center main bearing, showing the characteristic cracks in the bearing and in the associated webs.

The upper crank case 1 shown in the drawings is of the type generally known as the seven bearing type, having a front main bearing 2, a center main bearing 3 and a rear main bearing 4. Intermediate bearings 5 are spaced between these main bearings 2, 3 and 4. Side flanges by which the pan is fastened to the upper crank case 1 are shown at 6, and frame supports at 7.

The center main bearing 3 has two supporting webs 10 in spaced parallel relation on each side of the bearing 3. These webs 10 and the center main bearing 3 are cast integrally with the case 1. The upper portions of the webs 10 are joined by a flange member 11 welded between them. Preferably the flange member 11 is fitted with its upper surface flush with the upper edges of the webs 10, see Fig. V. One end 12 of the flange member 11 is welded to the center bearing 3 but the other end 13 is purposely left free to provide a measure of flexibility at this point. It is clear that this flange member 11 may easily be fitted to an old crank case as well as incorporated originally in a new crank case. It has been found that weakened or damaged crank cases may be given new life by introducing this flange member 11 as part of the repair work. Very good results have been obtained by the preheating welding process in putting in flange members 11.

The flange member 11 ties together the two webs 10 so that they function as a unit and thus transmit local strains all over the crank case 1. This dissemination of local strains by the flange member 11 at the center bearing 3 adds greatly to the strength of the crank case 1. So much of the strains all over the crank case 1 are disseminated toward the center bearing 3 that this point may be recognized as strategic. It has been found by experience that the installation of this flange member 11 at this point, materially strengthens the weakened crank case at other points and I now put this flange member 11 in all crank cases which I recondition and repair. The flange member 11 appears to act like the keel of a ship in integrating the structure as a unit. Too great a rigidity would detract from this function and hence the flange member 11 is more efficient if not directly tied to the flanges 6 of the crank case 1. The flange member 11 is the strategic addition which binds the parallel webs 10 together into a working unit. Without the flange member 11, these webs 10 tend to function independently; for example, a severe strain at the front of the crank case is absorbed by the forward web 10 without distribution to its associated web 10.

Thus my invention provides a means for strengthening crank cases which may be used in the original manufacture or in the repair of old crank cases. The weight of the crank case is not materially increased and the whole structure is strengthened throughout. While the above description of a specific embodiment of my invention is necessarily in detail, it will be obvious to those skilled in the art that certain changes and modifications may be made without departing from the spirit of the invention as hereinafter claimed.

Having thus described my invention, I claim:

A method of strengthening a weakened crank case having a main bearing supported by two spaced webs having upper edge portions extending from the bearing to the sides of the case which consists of the following steps: forming a flange member of a width proper to connect the upper edge portions of said webs between said bearing and the sides of said casing, positioning the flange member to connect the upper edge portions of the spaced webs in preparation for welding, and welding the positioned flange member to the upper edge portions of the two webs and to said main bearing.

HARRY GILMORE.